Patented Nov. 29, 1927.

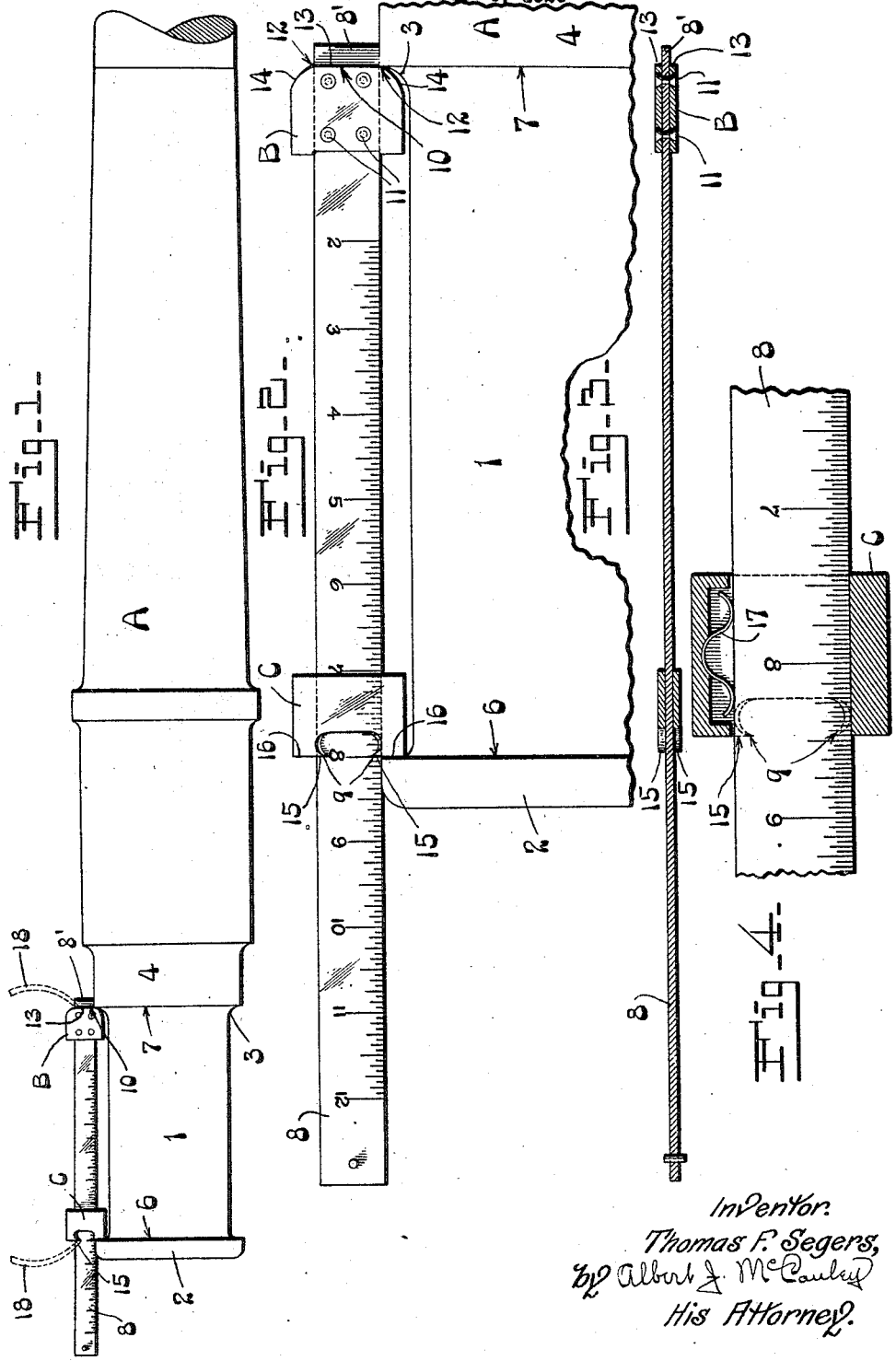

1,650,770

UNITED STATES PATENT OFFICE.

THOMAS F. SEGERS, OF SEDALIA, MISSOURI.

AXLE-MEASURING INSTRUMENT.

Application filed December 9, 1926. Serial No. 153,517.

This invention relates to a measuring instrument particularly adapted to aid in the inspection of the axles of railway rolling stock. Axles of this kind have journals at their ends and other parts which, when worn beyond certain limits, render the axles unsafe for continued service. The work of measuring the axles is usually performed very quickly with the aid of a pair of calipers and an ordinary rule, and in actual practice I found that the results are often inaccurate and unreliable. This is due partly to the difficulty of readily ascertaining some of the measurements by using the ordinary instruments.

The main object of this invention is to produce an instrument whereby such measurements can be very easily and quickly ascertained with a high degree of accuracy by an ordinary workman having no special skill in this work.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. 1 is a side elevation of a portion of an axle, showing a measuring instrument applied to the journal at one end of the axle.

Fig. 2 is a view on a larger scale showing the measuring instrument and the portion of the journal to which it is applied.

Fig. 3 is a longitudinal section of the measuring instrument.

Fig. 4 is an enlarged detail view, partly in section, showing a spring whereby the indicating member is forced into frictional engagement with the graduated scale.

To illustrate the invention I have shown a portion of an axle A provided with a journal 1 having a collar 2 at its outer end and a curved face 3 at its inner end. The collar 2 and the portion 4 of the axle are the same in diameter, but larger than the diameter of the journal. To make a proper inspection of the axle various dimensions must be ascertained, and it is especially important to accurately measure the diameter of the journal 1 and the distance between the shoulders formed by the face 6 and the corner 7, for the axle should be classed as unsafe when these measurements are not within certain authorized limits.

In using an ordinary rule it is difficult to measure the distance between the elements 6 and 7, as the corner 7 lies at the extremity of a curved face, and the workman usually tries to quickly locate one end of the rule at this corner while reading the measurement at the other corner.

The measuring device I have shown comprises a scale consisting of a straight metal bar 8 graduated as shown and provided with a rigid abutment block B adapted to be located at the corner 7, and a slidable indicating block C adapted to engage the face 6. The indicating block is formed with pointers 9 at an open recess to aid in reading the measurement.

The scale is also provided with a non-measuring extension 8' projecting from one side of the block B so as to contact with the portion 4 of the axle and thereby aid in positioning the instrument. It will be important to bear in mind that the zero point of the graduations lies at the line 10 and that the graduations are at one side of this line while the extension 8' lies at the other side.

The abutment block B may be secured to the scale by means of rivets 11, as shown in Fig. 2 and Fig. 3. The instrument is so designed that either of its straight edges can be placed on the axle. The block B is accordingly provided with axle-engaging shoulders 12 at each edge of the scale adapted to contact with the corner 7, and this block also has caliper-receiving shoulders 13 (Figures 2 and 3) at opposite sides of the scale, all of these shoulders 12 and 13 being at the zero line 10 from which the measurements are taken. To prevent contact with the curved portion 3 of the journal (Fig. 2), the abutment block B has diverging top and bottom edge faces 14 extending from axle-engaging shoulders 12.

The indicating block C has caliper-receiving shoulders 15 at both sides of the scale, as shown most clearly in Figures 2 and 3, and axle engaging shoulders 16 at each longitudinal edge of the scale. The shoulders 16 are designed to engage the face 6, as shown in Fig. 2.

To prevent accidental displacement of the indicating block (Fig. 4) it contains a spring 17 frictionally engaging one edge of the scale and forcing the block into frictional engagement with the other edge.

The non-measuring extension 8' has straight top and bottom edges alined with the body of the scale and forming continuations of its longitudinal edges.

In using the instrument to measure the distance between the face 6 and the corner 7, it is arranged as shown in Figs. 1 and 2, with one of the shoulders 12 at the corner 7 and the non-measuring extension 8' is supported on the adjacent portion of the axle. The indicating block C is moved along the scale until one of its shoulders 16 contacts with the face 6. The desired measurement can be quickly and accurately determined in this manner, and it is clearly shown at the indicating block. The instrument can then be removed from the axle to conveniently read the measurement, for the frictionally held indicating block is not liable to be displaced on the scale.

The diameters of the journals and other portions of the axle are measured by using ordinary calipers having legs 18, portions of which appear in Fig. 1. After the calipers are applied to a circular portion of the axle in the usual manner, one of the legs 18 is placed in contact with one of the caliper-receiving shoulders 13 on the rigid block B, and the indicating block C is then adjusted to locate one of its shoulders 15 in contact with the other leg. The desired measurement will then be clearly shown at the indicating block.

I claim:

1. In a measuring instrument a scale provided with a rigid abutment having a shoulder to position the scale and a caliper-receiving shoulder, said scale having graduations at one side of said shoulders and an extension at the other side to cooperate with the first mentioned shoulder in positioning the scale, both of said shoulders being at the zero point of the scale, and an indicating-abutment slidably mounted on the graduated portion of the scale, said indicating abutment having a caliper-receiving shoulder and a shoulder cooperating with the first mentioned shoulder.

2. An axle-measuring instrument comprising a scale, an abutment block rigidly secured to said scale, said abutment block having caliper-receiving shoulders at the sides of the scale and axle-engaging shoulders at the edges of the scale, all of said shoulders being at the zero point of the scale, said scale having graduations at one side of said shoulders and a straight extension at the opposite side alined with the body of the scale and adapted to rest upon the axle, said abutment block being provided with diverging edge faces extending from said axle-engaging shoulders, an indicating-block slidable along the graduated portion of the scale, said indicating-block having caliper-receiving shoulders at the sides of the scale and axle-engaging shoulders at the edges of the scale, and a spring whereby said indicating-block is forced into frictional engagement with the scale.

3. In a measuring instrument, a scale provided with a rigid abutment including a non-yielding shoulder to position the scale, said scale having a graduated portion at one side of said shoulder and a non-measuring portion extending from and exposed at the other side so as to cooperate with said shoulder in positioning the scale, said shoulder being at the zero point of the scale, and an indicating-abutment slidably mounted on the graduated portion of the scale, said indicating abutment having a shoulder cooperating with the first mentioned shoulder.

4. An axle-measuring instrument comprising an abutment block, a scale extending entirely through said abutment block and projecting from both sides thereof to provide a measuring member at one side of said block and a non-measuring extension at the other side, one side of said block being provided with an axle-engaging shoulder extending from the zero point of the scale, said scale having graduations at one side of said axle-engaging shoulder, said non-measuring extension being exposed at the other side of said shoulder and adapted to rest upon the axle, said abutment block being rigidly secured to said scale, and an indicating block slidable along the graduated portion of the scale, said indicating block being provided with an axle-engaging shoulder to cooperate with the first mentioned shoulder in measuring the axle.

In testimony that I claim the foregoing I hereunto affix my signature.

THOMAS F. SEGERS.